Figure 1:
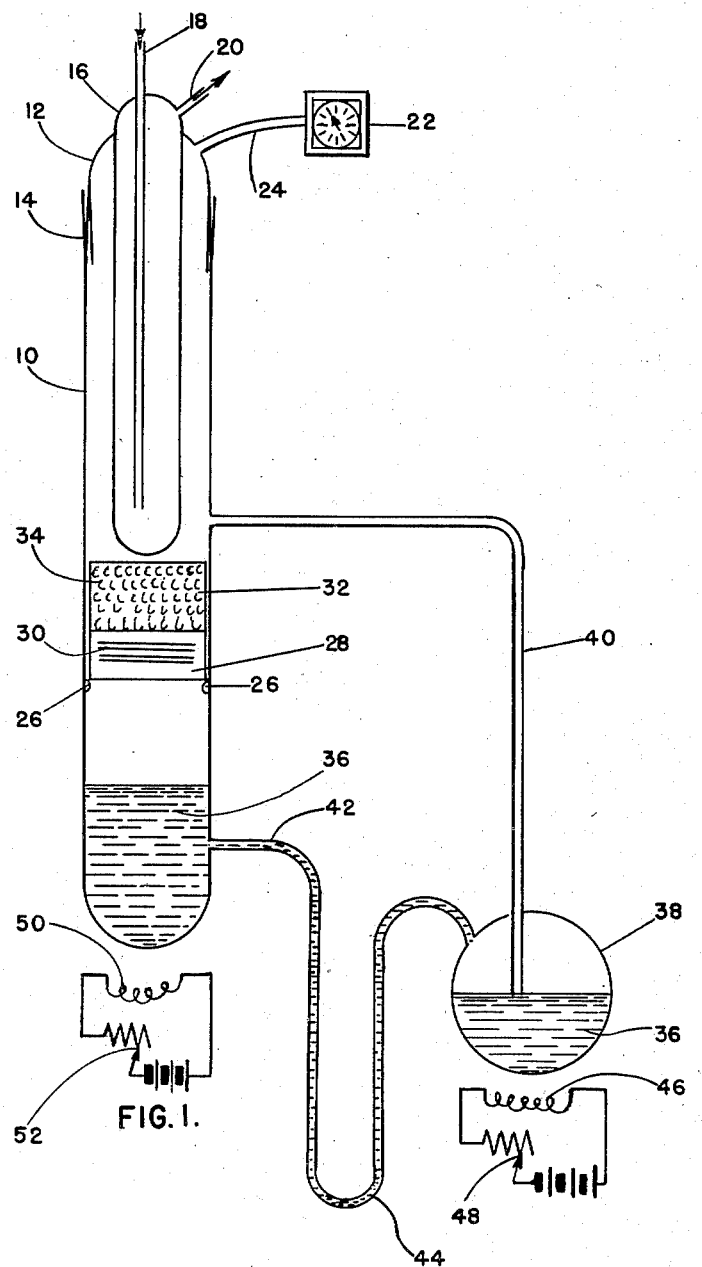

Nov. 28, 1950  I. KIRSHENBAUM ET AL  2,532,257
CORROSION TESTING APPARATUS
Filed Nov. 28, 1945

INVENTOR.
ISIDOR KIRSHENBAUM,
DAVID A. McCAULAY.
BY
Robert A. Lavender
ATTORNEY.

Patented Nov. 28, 1950

2,532,257

UNITED STATES PATENT OFFICE 2,532,257

CORROSION TESTING APPARATUS

Isidor Kirshenbaum, New York, N. Y., and David Allan McCaulay, Chicago, Ill., assignors to the United States of America as represented by the United States Atomic Energy Commission Application November 28, 1945, Serial No. 631,415

2 Claims. (Cl. 23—253)

The present invention relates to apparatus for simultaneously treating a material such as a metal sample with a corrosive fluid and its vapor and more particularly, to an apparatus for exposing the metal sample to the concurrent action of the corrosive fluid and vapor in a manner such that the actual effect of a volatile corrosive agent on the metal members of a distillation tower may be closely approximated.

The invention is particularly suitable for predetermining a choice of metallic packings, for example Stedman packings suitable for use in distillation towers in which fluorides are circulated, and for more accurately predicting the useful lifetime of the component metal parts of the installation.

In order to be satisfactory for the purpose indicated, such a testing apparatus must closely approximate actual fluid and vapor pressure and flow as well as temperature conditions of the commercial installation.

It is, therefore, an object of this invention to provide an apparatus for testing the effect of a continuous flow of corrosive fluid and vapor on a metal sample.

A further object is to provide a testing apparatus of the type indicated wherein the fluid and vapor pressure, flow, and temperature conditions may be controlled.

Other objects of the invention will be in part obvious and in part pointed out hereinafter.

The invention may best be appreciated by referring to the accompanying drawing wherein the single figure is a profile view of a corrosion testing apparatus illustrating somewhat schematically a preferred embodiment of the present invention.

Referring to the figure, the corrosion testing apparatus consists of a glass test-tube like cylinder 10 having a top or head 12 joined thereto by a ground glass joint 14 to seal out the atmosphere. Secured in the head 12 is a cold finger condenser 16 including an inlet 18 and outlet 20 for the introduction and discharge of a condenser coolant. A pressure regulating means 22 is also connected by a line 24 to the top 12 and provides means for regulating and maintaining a desired pressure in the cylindrical chamber 10.

Below the cold finger condenser 16 there are formed in the cylinder 10 several indentations 26 that support a glass sleeve 28 in which is secured a metal sample 30 that is to be tested. Resting above the sample 30 on the sleeve 28 is a second glass sleeve 32 that contains glass helices 34 for distributing evenly over the metal sample 30 a hot corrosive liquid 36. The liquid 36 is introduced as a combination liquid and vapor into cylindric chamber 10 by a means for feeding the liquid in pulses comprising a reservoir 38 through a connecting tube 40 at a point slightly above the lower end of the condenser 16. The vapor condenses on the condenser 16 and the liquid 36 drops onto the helices 34, which distribute the liquid evenly over the metal sample 30. Thereafter, the liquid is collected in the bottom of the cylinder 10 and is gravity fed by a glass conduit 42 into the reservoir 38. The conduit 42 is connected to the chamber 10 at a point below the normal level of the liquid 36 in the bottom of the chamber and enters the reservoir 38 above the normal liquid level point which is determined by the level to which the tube 40 extends into the reservoir. The tube 42 is bent into a U-shaped trap 44 which prevents the passage of the vapors from the reservoir into the lower end of the chamber 10.

The reservoir is individually heated by an external electrical heating unit 46 the heat output of which is controlled by control 48. The liquid in the chamber 10 is similarly heated by a heating unit 50 controlled by a rheostat 52 for the purpose of enveloping the test sample 30 in a hot corrosive vapor of the liquid 36.

The method of operation of the testing apparatus heretofore described is as follows: The metal packing sample 30 is placed in the sleeve 28 and set on the indentations 26 in the chamber 10. The sleeve 32 containing the helices 34 is placed on top of the sleeve 28 and the head 12 containing the condenser 16 is fitted into the chamber 10. A coolant such as water is circulated through connections 18 and 20 in the condenser. Thereafter, the liquid in the reservoir is heated by the unit 46 and forced through the tube 40 into the chamber 10 where any vapor carried over is condensed on the condenser 16. The liquid 36 is distributed over the metal sample 30 by the helices, as heretofore described, and is collected in the bottom of the chamber 10 from which it is siphoned through tube 42 into the reservoir 38. The liquid 36 in the chamber 10 is also partially vaporized by the heating unit 50 to thereby simultaneously treat the sample 30 with both vapor and hot liquid. The pressure in the chamber 10 is controlled by the pressure regulating means 22 and may be regulated to simulate the pressure conditions that are found in a particular commercial installation. In addition to visual inspection of the sample before and after treatment in the testing apparatus, physical changes may be determined by changes in weight of the sample and by suitable chemical tests.

From the above description it is apparent that the method of the present invention for testing the corroding properties of a metal sample is capable of accurately approximating the various corrosive conditions found in a variety of closed commercial installations such as, for example, distillation towers, and that the illustrated and described testing apparatus comprising a preferred embodiment of the invention is a compact and efficient structure for achieving the several objects set forth above.

It is, of course, to be understood that the invention is not limited to the specific construction shown in the drawing. Other types of heating units may be substituted for those shown. Similarly, alternative types of condensers and distributing helices may be substituted for those described and the apparatus may be constructed of material, other than glass, that are inert to the specific testing liquid. Other variations within the scope of the invention will be apparent to those skilled in the art.

Since many embodiments might be made of the present invention and since many changes might be made in the embodiment described, it is to be understood that the foregoing description is to be interpreted as illustrative only and not in a limiting sense.

We claim:

1. Apparatus for testing a sample for corrosion resistance comprising a closed tube arranged to contain a vaporizable corrosive liquid in the lower portion thereof, indentations centrally of said tube, a first sleeve supported on said indentations and arranged to support a sample out of contact with corrosive liquid in the lower portion of the tube, a second sleeve supportable by said first sleeve and containing a plurality of glass helices, a finger condenser in the upper portion of said tube, the lowermost portion of the condenser being above the second sleeve, a means for feeding the liquid in pulses including a reservoir arranged to contain a vaporizable corrosive liquid, a first conduit connecting said reservoir with the lower portion of the tube whereby liquid in said tube may flow into said reservoir, a second conduit connecting the said reservoir with the tube adjacent the condenser and above the second sleeve whereby the sample is periodically flushed with liquid corrosive material from the reservoir, heating means for the reservoir and heating means for the tube whereby the sample is continuously exposed to corrosive vapors and is periodically flushed with corrosive liquid by action of the feeding means.

2. Apparatus for testing a sample for corrosion resistance comprising a closed tube arranged to contain a vaporizable corrosive liquid in the lower portion thereof, indentation centrally of said tube, a first sleeve supported on said indentations and arranged to support a sample out of contact with corrosive liquid in the lower portion of the tube, a second sleeve supportable by said first sleeve and containing a plurality of glass helices, a finger condenser in the upper portion of said tube, the lowermost portion of the condenser being above the second sleeve, pressure regulating means in communication with the upper portion of said tube and arranged to control pressure in said tube, a means for feeding a liquid in pulses including a reservoir arranged to contain a vaporizable corrosive liquid, a first conduit connecting said reservoir with the lower portion of said tube whereby liquid in said tube may flow into said reservoir, a second conduit connecting said reservoir with the tube adjacent the condenser and above the second sleeve whereby the sample is periodically flushed with liquid corrosive material from the reservoir, heating means for the reservoir and heating means for the tube whereby the sample is continuously exposed to corrosive vapors and is periodically flushed with corrosive liquid by action of the pulsed feeding means.

ISIDOR KIRSHENBAUM.
DAVID ALLAN McCAULAY.

REFERENCES CITED

The following references are of record in the file of this patent:

UNITED STATES PATENTS

| Number | Name | Date |
|---|---|---|
| 1,415,546 | Greenwood | May 9, 1922 |
| 1,783,726 | Lappe et al. | Dec. 2, 1930 |
| 1,856,040 | Krebs et al. | Apr. 26, 1932 |
| 1,917,272 | Podbielniak | June 11, 1933 |
| 1,937,885 | Gitzen et al. | Dec. 5, 1933 |
| 2,005,323 | McMillan | June 18, 1935 |
| 2,236,278 | Jones | Nov. 7, 1944 |

FOREIGN PATENTS

| Number | Country | Date |
|---|---|---|
| 485,738 | Germany | Nov. 11, 1929 |

OTHER REFERENCES

Othmer, Industrial and Engineering Chemistry (Anal. Ed.), vol. 1 (1929), page 209.

Ace General Catalogue "40" (Oct. 1940), page 126 (7790), and page 129 (7840).

Gas Analysis and Testing of Gaseous Materials, Altieri (N. Y. C.), 1945, pages 352 and 447.